United States Patent
Mansfield et al.

(10) Patent No.: US 7,940,533 B2
(45) Date of Patent: May 10, 2011

(54) STEP-DOWN VOLTAGE CONVERTER

(75) Inventors: William M. Mansfield, Boulder, CO (US); Stig Lindemann, Aarhus N (DK)

(73) Assignee: Micro Motion, Inc., Boulder, CO (US)

( * ) Notice: Subject to any disclaimer, the term of this patent is extended or adjusted under 35 U.S.C. 154(b) by 604 days.

(21) Appl. No.: 11/994,387

(22) PCT Filed: Jul. 26, 2005

(86) PCT No.: PCT/US2005/026456
§ 371 (c)(1),
(2), (4) Date: Dec. 31, 2007

(87) PCT Pub. No.: WO2007/018498
PCT Pub. Date: Feb. 15, 2007

(65) Prior Publication Data
US 2010/0128499 A1 May 27, 2010

(51) Int. Cl.
*H02M 3/335* (2006.01)

(52) U.S. Cl. .................. 363/21.01; 363/16; 323/222

(58) Field of Classification Search .............. 363/16–20, 363/37, 49, 89, 91, 71, 62; 323/222, 224, 323/282–288, 271; 219/209, 497, 203
See application file for complete search history.

(56) References Cited

U.S. PATENT DOCUMENTS

| | | | |
|---|---|---|---|
| 3,566,253 A * | 2/1971 | O'Neill | 323/287 |
| 5,347,874 A | 9/1994 | Kalotay et al. | |
| 5,654,881 A | 8/1997 | Albrecht et al. | |
| 6,381,114 B1 | 4/2002 | Mansfield | |
| 6,507,174 B1 | 1/2003 | Qian | |
| 6,591,693 B1 * | 7/2003 | Mansfield et al. | 73/861.356 |

FOREIGN PATENT DOCUMENTS

| | | |
|---|---|---|
| CN | 1118624 | 3/1996 |
| CN | 2258992 | 8/1997 |
| GB | 1507898 A | 4/1978 |

(Continued)

OTHER PUBLICATIONS

Jia Wei et al. "Comparison of Three Topology Candidates for 12VVRM"APEC 2001.16th Annual IEEE Applied Power Electronics conference and exposion, Anaheim, CAMar. 4-8, 2001Annual Applied power conference, Newyork, NY. IEEE US, vol. 1of 2, conf. 16, Mar. 4, 2001, pp. 245-251.*

(Continued)

*Primary Examiner* — Rajnikant B Patel
(74) *Attorney, Agent, or Firm* — The Ollila Law Group LLC

(57) ABSTRACT

A step-down voltage converter (100) for generating an output voltage (VOUT) from an input voltage (VIN) is provided. The converter (100) includes a switch (111) having a first terminal (112) and a second terminal (114), wherein the second terminal (114) is electrically coupled with the output voltage (VOUT). Also included is a rectifier (117) having a first terminal (118) and a second terminal (120), wherein the second terminal (120) is electrically coupled with the output voltage (VOUT). A first inductor (124) electrically couples the first terminal (112) of the switch (111) with the input voltage (VIN). A second inductor (126) magnetically coupled with the first inductor (124) electrically couples the first terminal (118) of the rectifier (117) with a voltage reference (128). A switch controller (110) coupled with the output voltage (VOUT) is configured to control the switch (111).

14 Claims, 6 Drawing Sheets

FOREIGN PATENT DOCUMENTS

| JP | 2003183356 A | 7/2003 |
|---|---|---|
| RU | 2140704 | 10/1999 |
| SU | 1686650 A1 | 10/1991 |

OTHER PUBLICATIONS

O.V. Alekseev, V.E. Kitaev, A. Ya. Shikhin, edited by Professor A. Ya. Shikhin; Electro-Technical Devices, "Energoizdat" Publishing House, 1981.

E.M. Romash; Sources of Secondary Power Supply of Radio-Electronics; "Radio and Communication" Publishing House; 1981.

Jia Wei et al., "Comparison of Three Topology Candidates for 12V VRM", APEC 2001. 16th. Annual IEEE Applied Power Electronics Conference and Exposition, Anaheim, CA, Mar. 4-8, 2001, Annual Applied Power Electronics Conference, New York, NY, IEEE, US, vol. 1 of 2, Conf. 16, Mar. 4, 2001, pp. 245-251.

Peng Xu et al., "Investigation of Candidate Topologies for 12 V VRM", APEC 2002, 17th Annual IEEE Applied Power Electronics Conference and Exposition, Dallas, TX, Mar. 10-14, 2002, Annual Applied Power Electronics Conference, New York, NY, IEEE, US, vol. 2 of 2, Conf. 17, Mar. 10, 2002, pp. 686-692.

Jia Wei et al., "Static and Dynamic Modeling of the Active Clamp Coupled-Buck Converter", 32nd Annual IEEE Power Electronics Specialists Conference, PESC 2001, Conference Proceedings, Vancouver, Canada, Jun. 17-21, 2001, Annual Power Electronics Specialists Conference, New York, NY, IEEE, US, vol. 1 of 4 Conf. 32, Jun. 17, 2001, pp. 260-265.

Kaiwei Yao et al., "Tapped-Inductor Buck Converters with a Lossless Clamp Circuit", APEC 2002, 17th Annual IEEE Applied Power Electronics Conference and Exposition, Dallas, TX, Mar. 10-14, 2002, Annual Applied Power Electronics Conference, New York, NY, IEEE, US, vol. 2 of 2, Conf. 17, Mar. 10, 2002, pp. 693-698.

* cited by examiner

STEP-DOWN VOLTAGE CONVERTER

FIELD OF THE INVENTION

Aspects of the invention relate generally to electrical voltage converters, and more particularly to electrical step-down voltage converters producing a direct-current (DC) voltage from an alternating-current (AC) voltage or a DC voltage.

BACKGROUND OF THE INVENTION

Various electrically-powered equipment within an industrial environment often depend upon any of a variety of AC and/or DC voltages for power. More specifically, DC-oriented systems tend to utilize relatively low DC voltages, typically ranging from 12 to 50 volts DC (VDC). AC-oriented systems, however, often employ higher AC voltages, sometimes ranging between 100 and 250 volts root-mean-square (VRMS). Other AC or DC voltages outside of these ranges may be employed as well. However, industrial instrumentation, such as a Coriolis flowmeter for measuring mass flow and other information concerning a material flowing through a conduit, often employ electrical components that require a low DC voltage, such as 1.2-24 VDC, as an electrical power source, and thus are not capable of withstanding such a large range of AC or DC input voltages. Thus, a step-down converter capable of producing a substantially fixed low DC output voltage from either an AC or DC input voltage is often used to great advantage in such an environment.

A simplified schematic diagram of one particular type of step-down, or "buck," converter or regulator 1 currently in use for converting a positive DC input voltage $V_{IN}$ to a DC output voltage $V_{OUT}$ is provided in FIG. 1. The input voltage $V_{IN}$ is asserted across an input capacitor $C_A$ coupled with a ground reference, and is coupled with the drain terminal of an n-channel power field-effect transistor (FET) switch Q. The input capacitor $C_A$ acts as a filter to help maintain the voltage level seen by the drain of the switch Q in the presence of changes in the input voltage $V_{IN}$ by providing additional current on a temporary basis to the drain of the switch Q. Similar functionality for the output voltage $V_{OUT}$ is provided by an output capacitor $C_B$.

The gate of the switch Q is driven by a switch controller 2, which turns the switch Q ON and OFF depending on the voltage level of the output voltage $V_{OUT}$ compared to the desired or target output voltage $V_{OUT}$ level. Some other measurable quantity at the output, such as current, may be employed by the switch controller 2 alternatively or additionally. By turning the switch Q ON and OFF substantially periodically, the switch controller 2 is normally capable of maintaining the output voltage $V_{OUT}$ at a desirable level in the presence of changes in both the input voltage $V_{IN}$ level and the load driven by the output voltage $V_{OUT}$. Generally, the switching period is the sum of the ON time and the OFF time of the switch Q during one operation cycle. Accordingly, the duty cycle of the switch Q is the ratio of the ON time to the period. Thus, by way of any of a number of techniques, the switch controller 2 controls the duty cycle and period of the switch Q to maintain the output voltage $V_{OUT}$ at a satisfactory level.

During operation of the converter 1, when the switch Q is ON, electrical current flows from the input voltage $V_{IN}$, through the drain and source terminals of the switch Q, and through an inductor L, to the output voltage $V_{OUT}$. As a result of electrical current flowing through the inductor L, electrical energy is stored in the inductor L. Typically, the ON time of the switch Q, as set by the switch controller 2, is constrained by the component values of the inductor L and the output capacitor $C_B$ such that the voltage $V_L$ across the inductor is nearly constant during the ON time. Under these conditions, the terminal of the inductor L connected to the source terminal of the switch Q remains near the input voltage $V_{IN}$ while the switch Q is ON, and the remaining terminal of the inductor L is at the output voltage $V_{OUT}$ level. As a result, the voltage at the cathode 3 of a diode D coupled at the source terminal of the switch Q causes the diode D to be reverse-biased, and therefore not conducting, when the switch Q is ON, since the anode 4 of the diode D is connected to ground.

When the switch Q is then turned OFF, the voltage $V_L$ across the inductor L reverses polarity in order to maintain the continuity of the electrical current through the inductor L. That "flyback" in voltage causes the voltage at the cathode 3 of the diode D to drop below ground, thereby forward-biasing the diode D into conduction. Thus, electrical energy stored in the inductor L while the switch Q is ON is transferred as current through the diode D and the inductor. L to the output voltage $V_{OUT}$. At some point determined by the switch controller 2, the switch Q is once again turned ON, and the above cycle repeats. Current thus flows into the voltage output $V_{OUT}$ when the switch Q is either ON or OFF.

One potential drawback of the step-down converter 1 of FIG. 1 is the large voltage swing required from the switch controller 2 to drive the gate of the switch Q to turn the switch Q ON and OFF. More specifically, to turn the switch Q ON and maintain that state, the switch controller 2 must drive the gate to a voltage level higher than the input voltage $V_{IN}$, since the gate voltage must be above that of the source, which is close to the input voltage $V_{IN}$ during the ON state. To turn the switch Q OFF, the gate voltage must be near ground, since the source is driven to slightly below ground due to the diode D becoming forward-biased at that time due to the flyback of the inductor L. When the input voltage $V_{IN}$ is a relatively low DC voltage, generation of the proper gate voltage for the switch Q to be turned ON may be accomplished by way of a readily-available voltage "boost" circuit. However, when the input voltage $V_{IN}$ is a large AC voltage on the order of 265 VRMS, which translates to a maximum DC voltage level of about 375 VDC, timely and accurate control of the gate voltage while providing extremely large voltage swings at the gate of hundreds of volts typically requires a relatively complex circuit design for the switch controller 2 involving specialized electrical components.

SUMMARY OF THE INVENTION

Generally, embodiments of the present invention provide a step-down voltage converter for generating an output voltage from an input voltage. The converter includes a switch having first and second terminals, wherein the second terminal is electrically coupled with the output voltage. A rectifier has first and second terminals, wherein the second terminal is electrically coupled with the output voltage. A first inductor electrically couples the first terminal of the switch with the input voltage. A second inductor magnetically coupled with the first inductor electrically couples the first terminal of the rectifier with a voltage reference. Also, a switching controller coupled with the output voltage is configured to control the switch.

Additional embodiments and advantages of the present invention will be realized by those skilled in the art upon perusal of the following detailed description, taken in conjunction with the accompanying drawings.

Aspects

One aspect of the invention includes a step-down voltage converter for generating an output voltage from an input voltage, comprising:

a switch comprising a first terminal and a second terminal, wherein the second terminal of the switch is electrically coupled with the output voltage;

a rectifier comprising a first terminal and a second terminal, wherein the second terminal of the rectifier is electrically coupled with the output voltage;

a first inductor electrically coupling the first terminal of the switch with the input voltage;

a second inductor magnetically coupled with the first inductor, the second inductor electrically coupling the first terminal of the rectifier with a voltage reference; and a switching controller coupled with the output voltage and configured to control the switch.

Preferably, the first inductor and the second inductor each comprise an inductance of 1.7 millihenries.

Preferably, the step-down voltage converter further comprises:

a first capacitor electrically coupling the input voltage with the voltage reference; and a second capacitor electrically coupling the output voltage with the voltage reference.

Preferably, the first capacitor comprises a capacitance of 22 microfarads.

Preferably, the second capacitor comprises a capacitance of 120 microfarads.

Preferably, voltage reference is ground.

Preferably, a number of turns of the first inductor and a number of turns of the second inductor comprise a ratio of 1:1.

Preferably, the first inductor comprises a first winding of a transformer, wherein the second inductor comprises a second winding of the transformer, and wherein the first inductor and the second inductor are wound about a core.

Preferably, the core is a ferrite core.

Preferably, the input voltage and the output voltage are positive direct-current voltages;

the switch comprises an n-channel field-effect transistor, the first terminal of the switch comprises a drain terminal of the FET, the second terminal of the switch comprises a source terminal of the FET, and the switch controller controls the FET by way of a gate terminal of the FET; and the rectifier comprises a diode, the first terminal of the rectifier comprises an anode of the diode, and the second terminal of the rectifier comprises a cathode of the diode.

Preferably, the input voltage and the output voltage are negative DC voltages;

the switch comprises a p-channel field-effect transistor, the first terminal of the switch comprises a drain terminal of the FET, the second terminal of the switch comprises a source terminal of the FET, and the switch controller controls the FET by way of a gate terminal of the FET; and the rectifier comprises a diode, the first terminal of the rectifier comprises a cathode of the diode, and the second terminal of the rectifier comprises an anode of the diode.

Preferably, the switch controller is configured to control the switch by turning the switch on and off substantially periodically.

Preferably, the switch controller is configured to control the switch based on the output voltage.

Preferably, the switch controller is configured to control the switch based on a current at the output voltage.

Preferably, the input voltage is an alternating current input voltage; and the step-down voltage converter further comprises an AC rectification circuit coupling the AC input voltage with the first inductor.

Preferably, the AC rectification circuit is configured to convert the AC input voltage to a first positive DC voltage; and the output voltage is a positive DC output voltage having a lower magnitude that the first positive DC voltage.

Preferably, the AC rectification circuit is configured to convert the AC input voltage to a first negative DC voltage; and the output voltage is a negative DC output voltage having a lower magnitude that the first negative DC voltage.

Preferably, an item of industrial instrumentation comprises the step-down voltage converter.

Preferably, a Coriolis flowmeter comprises the step-down voltage converter.

DETAILED DESCRIPTION OF THE INVENTION

Figure 1:
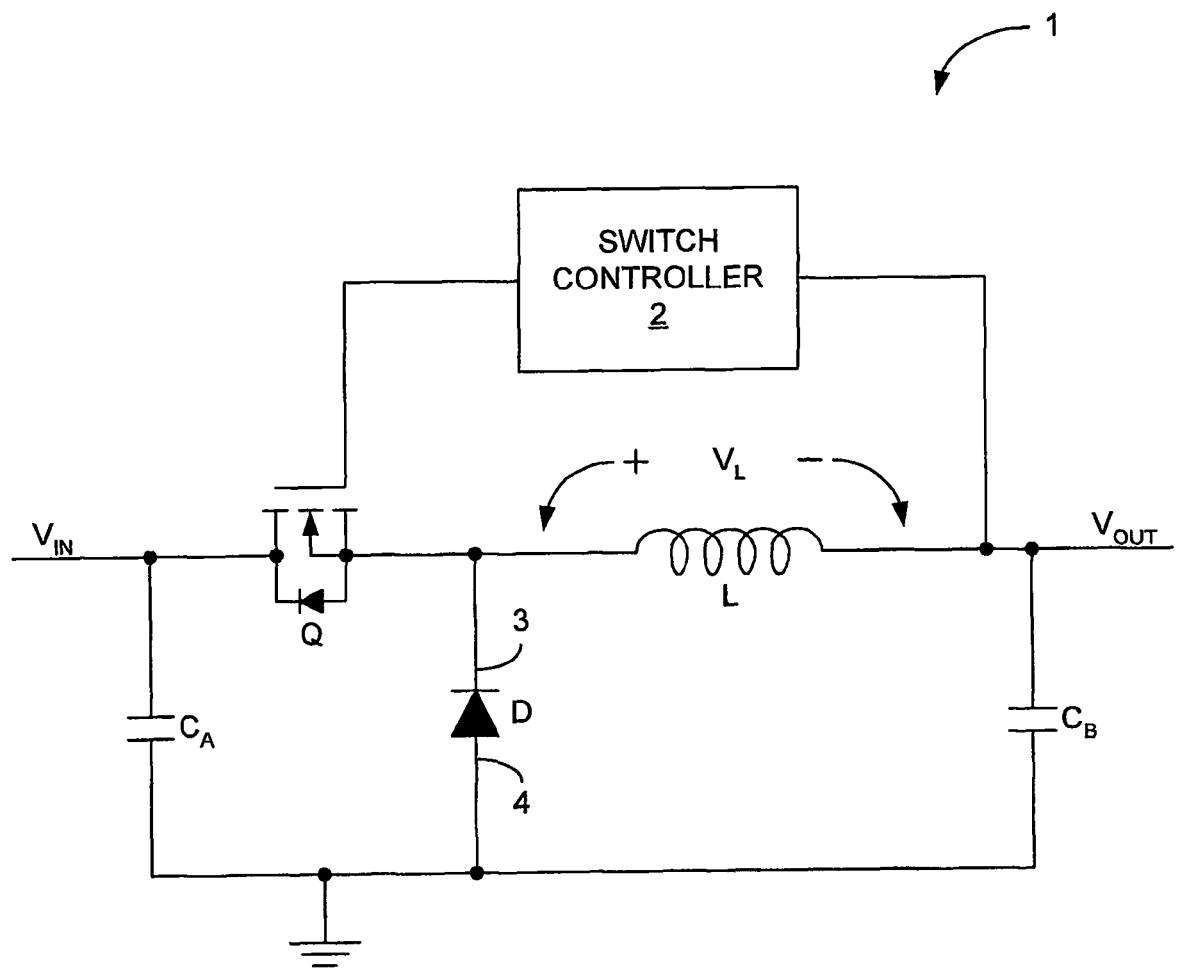
FIG. 1 is a block diagram of a step-down voltage converter according to the prior art.
Figure 2:
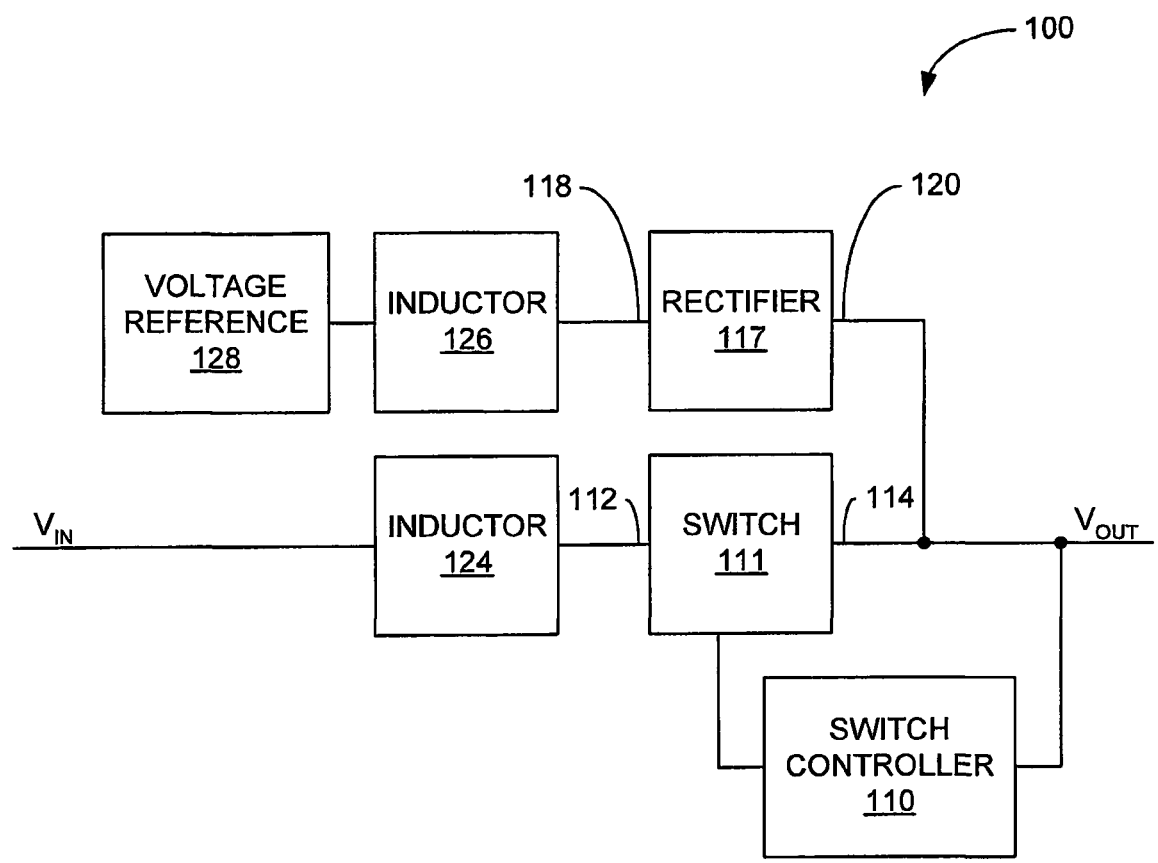
FIG. 2 is a block diagram of a step-down converter according to an embodiment of the invention.

FIG. 2 is a simplified block diagram of a step-down voltage converter 100 for generating an output voltage $V_{OUT}$ from an input voltage $V_{IN}$ according to an embodiment of the invention. Generally, the converter 100 includes a switch 111 having a first terminal 112 and a second terminal 114, wherein the second terminal 114 is coupled with the output voltage $V_{OUT}$. The first terminal 112 of the switch 111 is electrically coupled with the input voltage $V_{IN}$ by way of a first inductor 124. The switch 111 is controlled by way of a switch controller 110 coupled with the output voltage $V_{OUT}$. In addition, a second inductor 126 magnetically coupled with the first inductor 124 electrically couples a first terminal 118 of a rectifier 117 with a voltage reference 128, while a second terminal 120 of the rectifier 117 is electrically coupled with the output voltage $V_{OUT}$.

Figure 3:
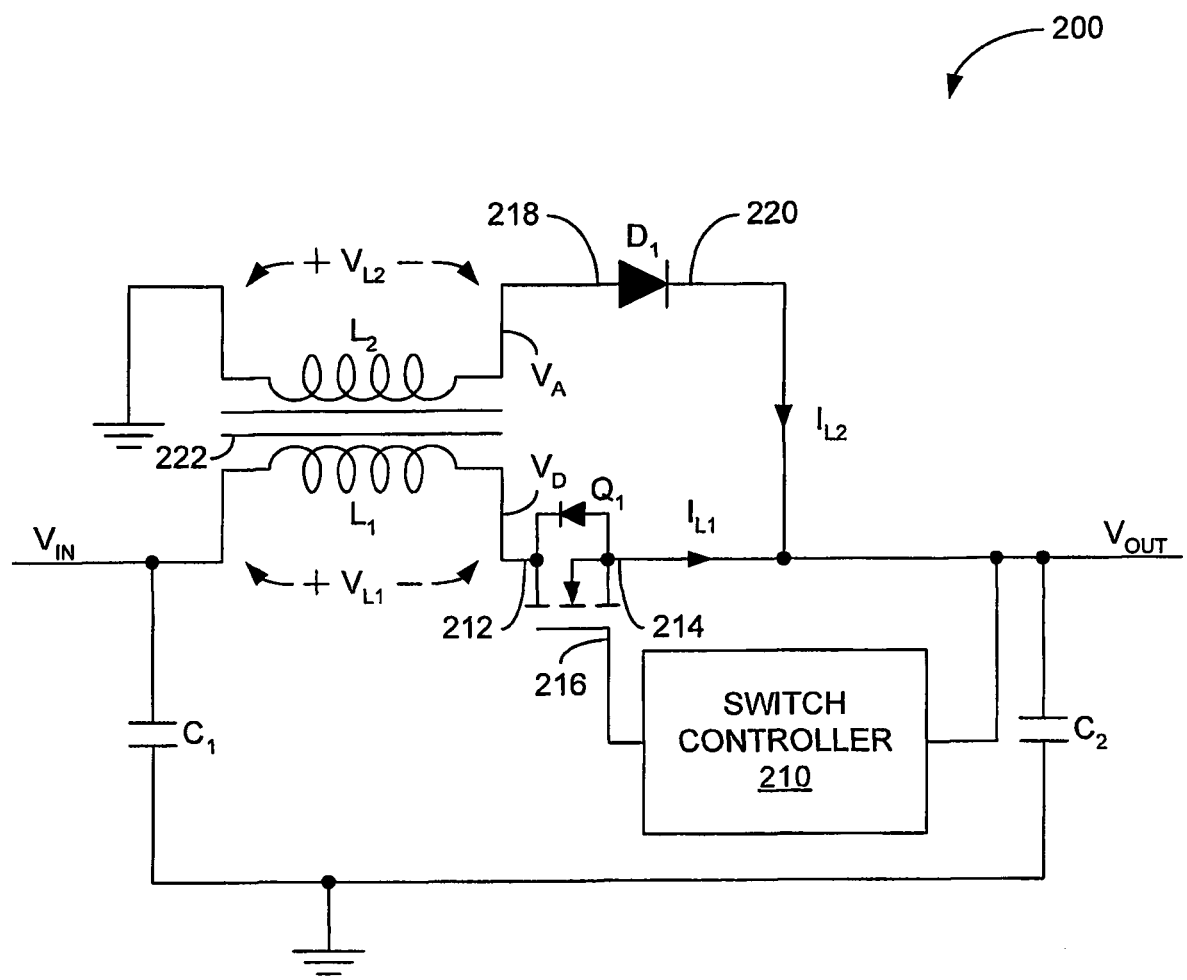
FIG. 3 is a schematic diagram of a step-down converter according to an embodiment of the invention for generating a positive DC output voltage from a positive DC input voltage.

FIG. 3 is a simplified schematic diagram of a specific example of the step-down voltage converter 100: a voltage converter 200 for generating a positive DC output voltage $V_{OUT}$ from a positive DC input voltage $V_{IN}$ according to an embodiment of the invention. The converter 200 includes a switch $Q_1$ having a first terminal 212 and a second terminal 214, wherein the second terminal 214 is coupled with the output voltage $V_{OUT}$. The first terminal 212 of the switch $Q_1$ is electrically coupled with the input voltage $V_{IN}$ by way of a first inductor $L_1$. The switch $Q_1$ is controlled by way of a switch controller 210 coupled with the output voltage $V_{OUT}$.

In addition, a second inductor $L_2$ magnetically coupled with the first inductor $L_1$ electrically couples an anode 218 of a rectifier or diode $D_1$ with a voltage reference, while a cathode 220 of the diode $D_1$ is electrically coupled with the output voltage $V_{OUT}$.

More specifically regarding the particular example of the converter 200 of FIG. 3, the switch $Q_1$ may be a FET, such as an n-channel power FET, having a drain terminal 212, a source terminal 214, and a gate terminal 216. As is described in greater detail below, the switch controller 210 controls the FET $Q_1$ by turning the FET $Q_1$ ON and OFF by way of the gate 216. In one embodiment, the switch controller 10 turns the FET $Q_1$ ON and OFF substantially periodically, based at least in part on the voltage level of the output voltage $V_{OUT}$. In other embodiments, the switch controller 210 may employ another characteristic of the output, such as current, to control the FET $Q_1$. In another example, a combination of output characteristics, such as voltage and current, may be employed to control $Q_1$. In alternative embodiments, other types of electronic components, such as bipolar junction transistors (BJTs), may be employed in lieu of the FET $Q_1$ to similar end.

In the particular embodiment of FIG. 3, a first capacitor $C_1$ electrically couples the input voltage $V_{IN}$ with the voltage reference, while the output voltage $V_{OUT}$ is electrically coupled to the reference by way of a second capacitor $C_2$. In one embodiment, the voltage reference is ground, or 0 V. The first capacitor $C_1$ and the second capacitor $C_2$ are employed as filter capacitors to help supply short-term electrical current needs in order to support the voltage level of both the input voltage $V_{IN}$ and the output voltage $V_{OUT}$, as well as to remove high-frequency noise. In one particular implementation, the first capacitor $C_1$, has a capacitance of 22 microfarads (μF), while the second capacitor $C_2$ has a capacitance of 120 μF.

In one embodiment, the first inductor $L_1$ and the second inductor $L_2$ form first and second windings of a transformer sharing a single core 222, such as a ferrite core, about which both of the inductors $L_1$, $L_2$ are wound. Cores comprised of other materials may be implemented in other embodiments of the invention. Also, in one implementation, the number of turns of the first inductor $L_1$ and the number of turns of the second inductor $L_2$ about the core form a 1:1 ratio. Other ratios may be possible in alternative embodiments, although a 1:1 ratio is assumed in the following discussion of the converter 200 operation. In one example, the inductors $L_1$, $L_2$ each have an inductance of 1.7 millihenries (mH).

The operation of the converter 200 is dependent upon the state of the switch or FET $Q_1$. The switch controller 210 turns ON the FET $Q_1$ by raising the voltage of the gate 216 sufficiently above the voltage at the source 214, which is the output voltage $V_{OUT}$, to turn ON the switch $Q_1$. When the FET $Q_1$ is ON, the voltage $V_D$ at the drain 212 of the FET $Q_1$ is also approximately equal to the output voltage $V_{OUT}$, and electrical current flows from the input voltage $V_{IN}$, through the first inductor $L_1$, the drain 212 and the source 214 of the FET $Q_1$, to the output voltage $V_{OUT}$. As a result, electrical energy is stored in the first inductor $L_1$, typically within the core 222 about which the first inductor $L_1$ is wound. Also, due to the 1:1 magnetic coupling of the first inductor $L_1$ and the second inductor $L_2$, the voltage $V_{L1}$ across the first inductor $L_1$ equals the voltage $V_{L2}$ across the second inductor $L_2$. Thus, since the voltage across the first inductor $L_1$ is essentially the input voltage $V_{IN}$ minus the output voltage $V_{OUT}$, the voltage $V_A$ at the anode 218 of the diode $D_1$ becomes $-(V_{IN}-V_{OUT})$. Therefore, with the cathode 220 coupled with the output voltage $V_{OUT}$, the anode 218 voltage $V_A$ is less than that at the cathode 220, causing the diode $D_1$ to be reverse-biased, and hence nonconducting. Therefore, essentially no current flows through the second inductor $L_2$ while the switch $Q_1$ is ON, and electrical energy is stored in the core 222 while current flows through the first inductor $L_1$.

When the switch controller 210 turns the switch $Q_1$ OFF, the voltage $V_{L1}$ across the first inductor $L_1$ becomes negative in an attempt to maintain its former electrical current level, thus driving the drain 212 of the switch $Q_1$ above the input voltage $V_{IN}$. Due to the magnetic coupling between the two inductors $L_1$, $L_2$, the voltage $V_1$ across the second inductor $L_2$ matches the voltage $V_{L1}$ across the first inductor $L_1$. As a result, the voltage $V_{L2}$ across the second inductor $L_2$ approaches the negative of the output voltage $-V_{OUT}$, at which point the diode $D_1$ becomes forward-biased and conducting. Ignoring a typically small voltage drop across the diode $D_1$, the voltage $V_{L1}$ across the first inductor $L_1$ is thus also limited to $-V_{OUT}$, thus clamping the voltage $V_D$ at the drain 212 of the switch $Q_1$ at the sum of the input voltage $V_{IN}$ and the output voltage $V_{OUT}$ (i.e., $V_{IN}+V_{OUT}$). As a result of this clamping, energy previously stored in the core 222 of the inductors $L_1$, $L_2$ is delivered in the form of current through the second inductor $L_2$ and the diode $D_1$ to the output voltage $V_{OUT}$. After a period of time, the switch controller 210 once again turns ON the switch $Q_1$, and the process is repeated. Whether the switch $Q_1$ is ON or OFF, current flows from the converter 200 toward the output voltage $V_{OUT}$.

Figure 4:
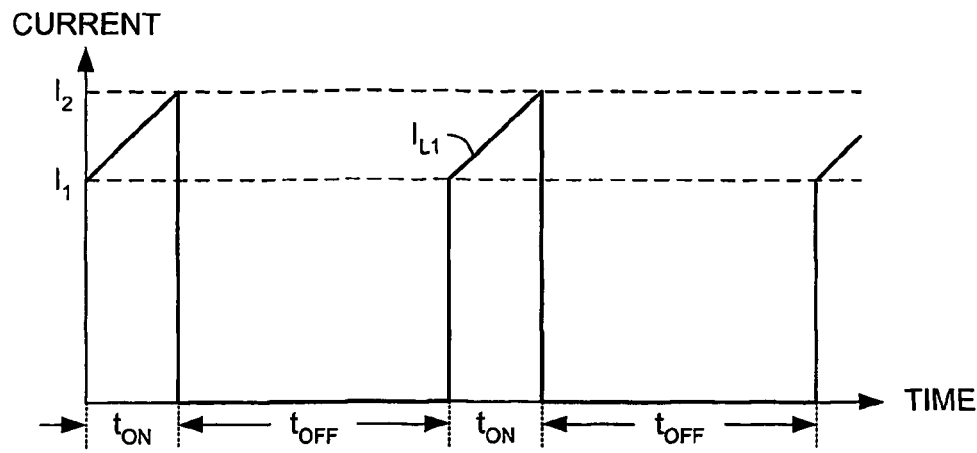
FIG. 4 is timing diagram of the current through a first inductor and a second inductor, the voltage at the drain of a switch, and the voltage at the anode of a diode, as implemented in a particular embodiment of the step-down voltage converter of FIG. 3.
Figure 4:
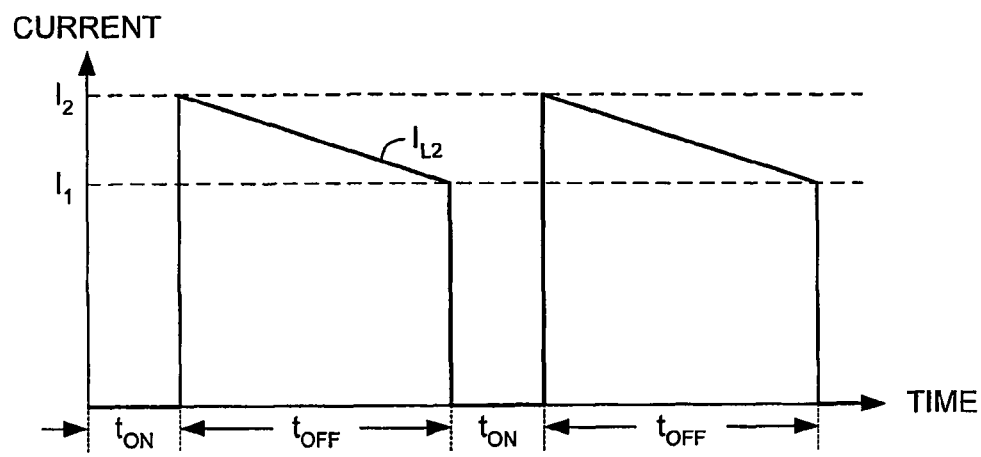
Figure 4:
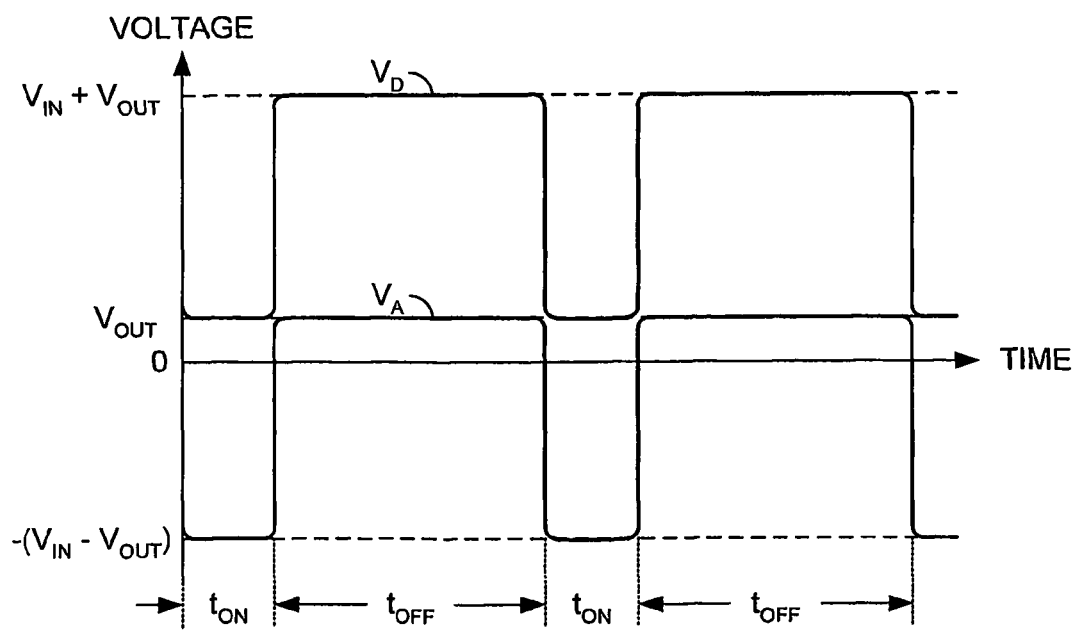

FIG. 4 illustrates, by way of a simplified timing diagram, waveforms of an electrical current $I_{L1}$ through the first inductor $L_1$ and a current $I_{L2}$ through the second inductor $L_2$ according to a particular embodiment of the invention. Also, the voltage $V_D$ at the drain 212 of the switch $Q_1$ and the voltage $V_A$ at the anode 218 of the diode $D_1$ during the same time period are also illustrated. In this example, the input voltage $V_{IN}$ is 50 VDC, the output voltage $V_{OUT}$ is 12 VDC, and the load (not shown) driven by the output voltage $V_{OUT}$ is 40 ohms (Ω). Also in this specific example, the first capacitor $C_1$ has a capacitance of 22 μF, the second capacitor $C_2$ is 120 μF, and the inductors $L_1$, $L_2$ each exhibit an inductance of 1.7 mH. In addition, the switch $Q_1$ is an n-channel power FET, part number STD5NM50, and the diode $D_1$ is a MURS160.

The timing diagram of FIG. 4 depicts the typically periodic nature in which the converter 200 operates. For a time $t_{ON}$ during which the switch $Q_1$ is ON, the current $I_{L1}$ through the first inductor $L_1$ increases essentially linearly from a level $I_1$ to a higher level $I_2$. During that same time period, the diode $D_1$ is reverse-biased, and thus essentially no current flows through the second inductor $L_2$. Also, the voltage $V_D$ at the drain 212 of the switch $Q_1$ remains at about $V_{OUT}$ due to the switch $Q_1$ being ON, and the voltage $V_A$ at the anode 218 of the diode $D_1$ is $-(V_{IN}-V_{OUT})$, as described earlier. In other words, the voltages $V_{L1}$, $V_{L2}$ across the inductors $L_1$, $L_2$ are equal at $(V_{IN}-V_{OUT})$, with the drain voltage $V_D$ offset higher than the anode voltage $V_A$ by the value of the input voltage $V_{IN}$.

This equality of the voltages $V_{L1}$, $V_{L2}$ across the inductors $L_1$, $L_2$, and the relative offset of $V_{IN}$ between the drain voltage $V_D$ and the anode voltage $V_A$, hold true when the switch $Q_1$ is OFF. During the switch $Q_1$ OFF time $t_{OFF}$, with the diode $D_1$ conducting, the anode voltage $V_A$ is clamped at the output voltage $V_{OUT}$. With the drain voltage $V_D$ offset higher than the anode voltage $V_A$ by the input voltage $V_{IN}$, the drain voltage $V_D$ is clamped at $(V_{IN}+V_{OUT})$, as described above. Also, since the switch $Q_1$ is OFF, the current in the first inductor $L_1$ is essentially zero, while the current in the second inductor $L_2$ decreases substantially linearly from $I_2$ to $I_1$ due to constant voltage $-V_{OUT}$ across the second inductor $L_2$.

In the particular embodiment illustrated in FIG. 4, the upper current level $I_2$ is approximately 350 milliamps (mA), while the lower current level $I_1$ is about 250 mA. Since the current $I_{L1}$ through the inductor $L_1$ and the current $I_{L2}$ through the inductor $L_2$ are provided at the output voltage $V_{OUT}$, the average current delivered to the 40-Ω load is (12 VDC)/(40Ω)= 300 mA. The switch controller 210 adjusts $t_{ON}$ and $t_{OFF}$ based on the component values of the inductors $L_1$, $L_2$, the tolerance of the load being driven to variations in the output voltage $V_{OUT}$, and other factors. In the case of FIG. 4, $t_{ON}$ is about 5 microseconds (μS), while $t_{OFF}$ is about 15 μS. Since the voltage across an inductor L is equal to L(di/dt), a constant voltage $V_{L1}$ across the first inductor $L_1$ during $t_{ON}$ of $V_{IN}-V_{OUT}$=(50 VDC)-(12 VDC)=38 VDC is approximately three times the magnitude of the voltage $V_{L2}$ across the second inductor $L_2$ during $t_{OFF}$ of $-V_{OUT}$=-12 V, thus accounting for $t_{OFF}$ being approximately three times as long as $t_{ON}$ in this particular case. Of course, with a different combination of input voltage $V_{IN}$ and output voltage $V_{OUT}$, a different ratio of $t_{ON}$ to $t_{OFF}$ would likely be implemented by the switch controller 210.

Given the various embodiments of the converter 200 disclosed herein, a wide range of positive DC voltages may be employed as the input voltage $V_{IN}$ in order to produce a lower-magnitude positive DC output voltage $V_{OUT}$. As mentioned above, the various components employed, such as the inductors $L_1$, $L_2$, the capacitors $C_1$, $C_2$, the diode $D_1$, the switch $Q_1$, and the switch controller 210, determine in part the limits of the input and output voltages $V_{IN}$, $V_{OUT}$ allowed for a particular embodiment of the invention.

A distinct advantage of various embodiments of the converter 200 described above is the limited voltage swing of the gate 216 of the switch $Q_1$ required to turn ON and OFF the switch $Q_1$. Since the source 214 of the switch $Q_1$ is coupled directly to the output voltage $V_{OUT}$, the voltage of the gate 216 is required to move only between the output voltage $V_{OUT}$ and a few volts higher to operate the switch $Q_1$. Thus, the gate 216 of $Q_1$ may be driven by standard, readily-available electronic components, thereby simplifying the design of the switch controller 210. One or more of these advantages, or others, may also be realized in other applications employing one or more embodiments of the present invention.

Similar advantages may also be realized by another voltage converter 300 according to another embodiment of the invention. Shown in FIG. 5, the converter 300, which operates in a manner analogous to that of the converter 200 described above, is configured to convert a negative DC input voltage $V_{IN}$ into a lower-magnitude negative DC output voltage $V_{OUT}$. While most of the components of the converter 200 and the converter 300, such as the inductors $L_1$, $L_2$, the core 222, and the capacitors $C_1$, $C_2$, are the same, a few modifications are utilized to process the negative DC input voltage $V_{IN}$. In place of the switch $Q_1$ of the converter 200 is a switch $Q_2$, which is a p-channel power FET in the particular example of FIG. 5. The switch $Q_2$ includes a drain terminal 312 coupled with the first inductor $L_1$, a source terminal 314 coupled with the output voltage $V_{OUT}$, and a gate terminal 316. A switch controller 310, operating in a similar fashion to that of the switch controller 210 of the converter 200, controls the operation of the switch $Q_2$ via the gate 316. The switch controller 310 need only move the voltage of the gate 316 between the output voltage $V_{OUT}$ and a few volts lower to operate the switch $Q_2$, thus simplifying the design of the switch controller 310 compared to some prior art converters.

Figure 5:
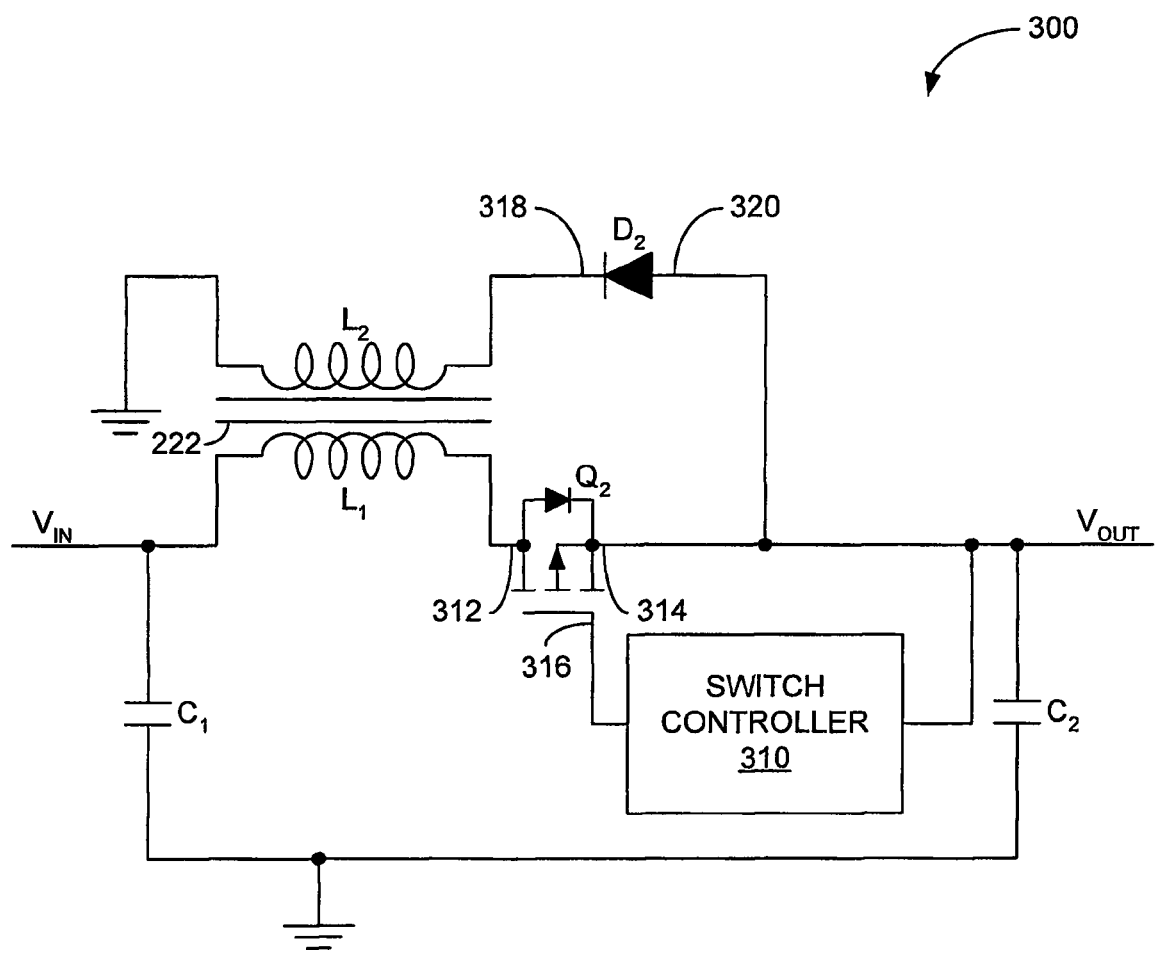
FIG. 5 is a schematic diagram of a step-down converter according to an embodiment of the invention for generating a negative DC output voltage from a negative DC input voltage.

The converter 300 of FIG. 5 also includes a diode $D_2$ having a first terminal 318 and a second terminal 320. Due to the negative polarity of the input and output voltages $V_{IN}$, $V_{OUT}$, the first terminal 318 is the cathode, while the second terminal 320 is the anode, opposite the orientation of the diode $D_1$ of the converter 200. Operation of the converter 300 is analogous to that described above in conjunction with the converter 200 of FIG. 3, with the polarity of all voltages and currents essentially inverted.

Figure 6:
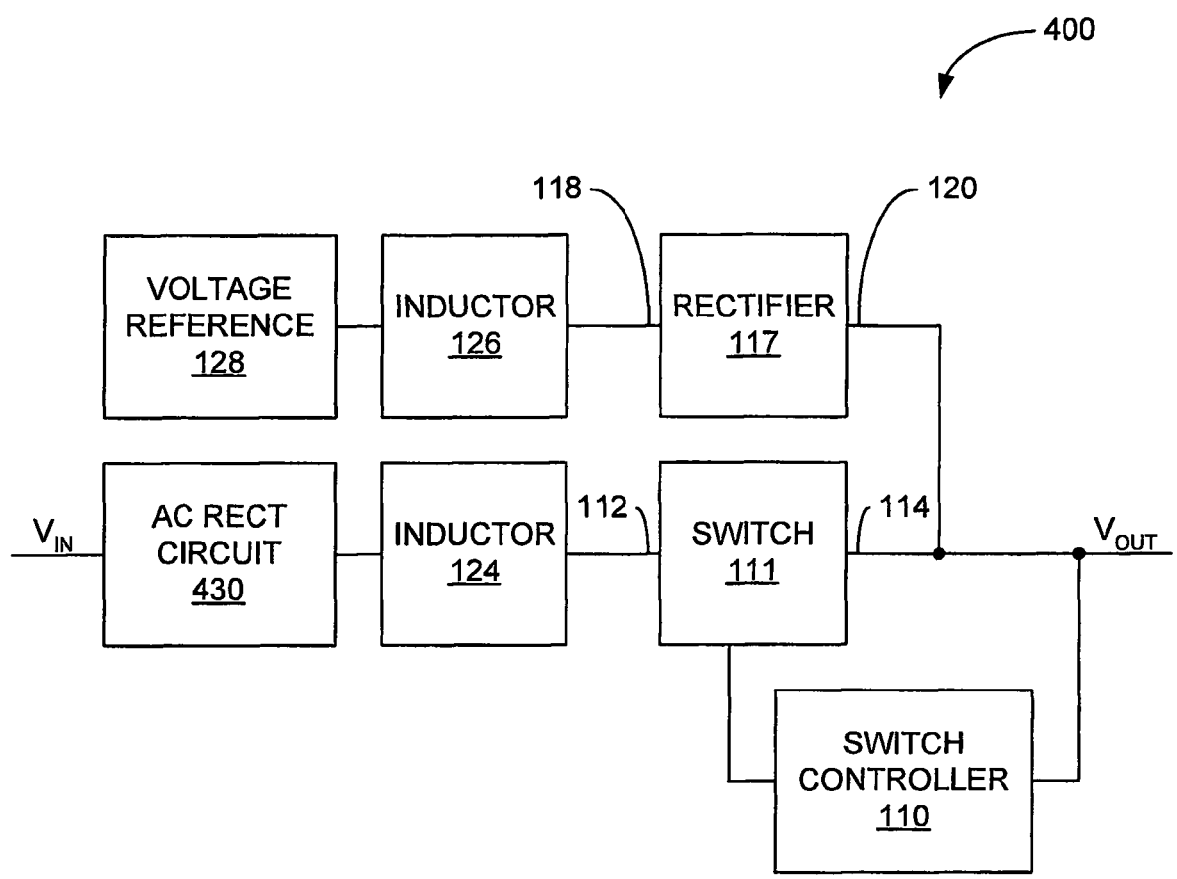
FIG. 6 is block diagram of the step-down converter of FIG. 2 further employing an AC rectification circuit for an AC input voltage.

A further embodiment of a voltage converter 400 according to an embodiment of the invention for converting an AC input voltage $V_{IN}$ to a DC output voltage $V_{OUT}$ is presented in FIG. 6. In addition to the components described above in conjunction with the converter 100 of FIG. 2, an AC rectification circuit 430 for converting the AC input voltage $V_{IN}$ to a DC voltage usable by the remainder of the voltage converter 400 is utilized to generate the desired DC output voltage $V_{OUT}$. In one embodiment in which a positive DC output voltage $V_{OUT}$ is required, the AC rectification circuit 430 may be configured to convert the AC input voltage $V_{IN}$ to a first positive DC voltage, which may then be converted to a lower-magnitude DC output voltage $V_{OUT}$ by way of the converter 200 of FIG. 3. In another embodiment, if a negative DC output voltage $V_{OUT}$ is needed, the AC rectification circuit 430 may be configured to convert the AC input voltage $V_{IN}$ to a first negative DC voltage, which in one implementation is subsequently converted to a lower-magnitude negative DC output voltage $V_{OUT}$ via the converter 300 of FIG. 5.

While several embodiments of the invention have been discussed herein, other embodiments encompassed within the scope of the invention are possible. For example, different AC and DC voltage levels may be involved in alternative embodiments, thus possibly indicating the use of component values other than those specifically disclosed herein. Further, references to positive and negative voltage polarities are provided for reference only, and other embodiments of the invention may utilize a different voltage referencing scheme. In addition, components that are electrically coupled may not necessarily be directly interconnected in alternative embodiments. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A step-down voltage converter (100) for generating a direct-current (DC) output voltage ($V_{OUT}$) from a direct-current (DC) input voltage ($V_{IN}$), comprising:
    a field-effect transistor (FET) ($Q_1$) switch (111) comprising a drain terminal (112) and a source terminal (114), wherein the source terminal (114) of the switch (111) is electrically coupled with the output voltage ($V_{OUT}$);
    a diode (117) comprising an anode (118) and a cathode (120), wherein the cathode (120) of the diode (117) is electrically coupled with the output voltage ($V_{OUT}$);
    a first inductor (124) electrically coupling the drain terminal (112) of the switch (111) with the input voltage ($V_{IN}$);
    a second inductor (126) magnetically coupled with the first inductor (124), the second inductor (126) electrically coupling the anode (118) of the diode (117) with a voltage reference (128); and
    a switching controller (110) coupled with the output voltage ($V_{OUT}$) and configured to control the switch (111) by way of a gate terminal (216) of the FET ($Q_1$).

2. The step-down voltage converter (100) of claim 1, wherein the first inductor (124) and the second inductor (126) each comprise an inductance of 1.7 millihenries.

3. The step-down voltage converter (100) of claim 1, further comprising:
   a first capacitor ($C_1$) electrically coupling the input voltage ($V_{IN}$) with the voltage reference (128); and
   a second capacitor ($C_2$) electrically coupling the output voltage with the voltage reference (128).

4. The step-down voltage converter (100) of claim 3, wherein the first capacitor ($C_1$) comprises a capacitance of 22 microfarads.

5. The step-down voltage converter (100) of claim 3, wherein the second capacitor ($C_2$) comprises a capacitance of 120 microfarads.

6. The step-down voltage converter (100) of claim 1, wherein the voltage reference (128) is ground.

7. The step-down voltage converter (100) of claim 1, wherein a number of turns of the first inductor (124) and a number of turns of the second inductor (126) comprise a ratio of 1:1.

8. The step-down voltage converter (100) of claim 1, wherein the first inductor (124) comprises a first winding of a transformer, wherein the second inductor (126) comprises a second winding of the transformer, and wherein the first inductor (124) and the second inductor (126) are wound about a core (222).

9. The step-down voltage converter (100) of claim 8, wherein the core (222) is a ferrite core.

10. The step-down voltage converter (100) of claim 1, wherein:
    the input voltage ($V_{IN}$) and the output voltage ($V_{OUT}$) are negative DC voltages; and
    the switch (111) comprises a p-channel field-effect transistor (FET)($Q_2$).

11. The step-down voltage converter (100) of claim 1, wherein the switch controller (110) is configured to control the switch (111) by turning the switch (111) on and off substantially periodically.

12. The step-down voltage converter (100) of claim 1, wherein the switch controller (110) is configured to control the switch (111) based on the output voltage ($V_{OUT}$)

13. An item of industrial instrumentation comprising the step-down voltage converter (100) of claim 1.

14. A Coriolis flowmeter comprising the step-down voltage converter (100) of claim 1.

\* \* \* \* \*